United States Patent
Horne

(10) Patent No.: US 7,090,315 B1
(45) Date of Patent: Aug. 15, 2006

(54) ELECTRICAL CABINET AND A FRAME THEREFOR

(75) Inventor: David Horne, South Wonston (GB)

(73) Assignee: APW Electronics Limited, Hampshire (GB)

( * ) Notice: Subject to any disclaimer, the term of this patent is extended or adjusted under 35 U.S.C. 154(b) by 0 days.

(21) Appl. No.: 09/868,781

(22) PCT Filed: Dec. 23, 1999

(86) PCT No.: PCT/GB99/04394

§ 371 (c)(1),
(2), (4) Date: Apr. 8, 2002

(87) PCT Pub. No.: WO00/41283

PCT Pub. Date: Jul. 13, 2000

(30) Foreign Application Priority Data

Dec. 30, 1998 (GB) ................................ 9828843.4

(51) Int. Cl.
*A47G 29/00* (2006.01)

(52) U.S. Cl. .................................... 312/265.4; 361/752

(58) Field of Classification Search ............ 312/265.4, 312/265.1, 265.2, 265.3, 223.1; 174/17 R, 174/50; 361/752, 796, 829, 831; 211/26; D13/184, 199; 108/150, 157.1
See application file for complete search history.

(56) References Cited

U.S. PATENT DOCUMENTS

| | | | |
|---|---|---|---|
| 3,281,194 A * | 10/1966 | Bozarth et al. | 312/199 |
| 3,606,020 A | 9/1971 | Kern | |
| 3,833,279 A * | 9/1974 | MacKenzie, Jr. | 312/265.1 |
| 5,292,189 A * | 3/1994 | Lau et al. | 312/265.3 |
| 5,380,083 A * | 1/1995 | Jones et al. | 312/265.3 |
| 5,388,903 A * | 2/1995 | Jones et al. | 312/334.29 |
| 5,488,543 A | 1/1996 | Mazura et al. | |
| 5,499,585 A * | 3/1996 | Vanderminden, Sr. | 108/158.11 |
| 5,536,079 A * | 7/1996 | Kostic | 312/265.3 |
| 5,639,150 A * | 6/1997 | Anderson et al. | 312/265.3 |
| 5,695,263 A * | 12/1997 | Simon et al. | 312/265.4 |
| 5,806,945 A * | 9/1998 | Anderson et al. | 312/265.3 |
| 6,036,290 A * | 3/2000 | Jancsek et al. | 312/265.4 |
| D437,300 S * | 2/2001 | Horne | D13/199 |
| 6,293,637 B1 * | 9/2001 | Anderson et al. | 312/265.1 |
| 6,407,332 B1 * | 6/2002 | Buchberger et al. | 174/50 |
| 6,515,225 B1 * | 2/2003 | Wright | 174/50 |
| 6,527,351 B1 * | 3/2003 | Sevier et al. | 312/265.2 |
| 2001/0015598 A1 * | 8/2001 | Sevier | 312/265.1 |
| 2003/0062326 A1 * | 4/2003 | Guebre-Tsadik | 211/26 |

FOREIGN PATENT DOCUMENTS

| | | |
|---|---|---|
| DE | 297 09 227 | 7/1997 |
| EP | 514668 A1 * | 11/1992 |
| EP | 522252 A1 * | 1/1993 |
| GB | 1 141 661 | 1/1969 |
| GB | 1 285 357 | 8/1972 |
| GB | 2 074 845 | 11/1981 |

(Continued)

*Primary Examiner*—Korie Chan
(74) *Attorney, Agent, or Firm*—Quarles & Brady LLP

(57) ABSTRACT

An electrical cabinet and a frame therefor, wherein the frame comprises side members connected together by transverse members. Each transverse member is made from bars or tubes in a skeletal form with at least one recess in the side of the transverse member. The skeletal form of each transverse member makes it cheap to manufacture and can provide for large recesses, thereby facilitating cable access. The electrical cabinet comprises removable side panels and a door mounted on the frame. The frame can also provide mounting points for subracks of electrical or electronic components.

17 Claims, 4 Drawing Sheets

FOREIGN PATENT DOCUMENTS

| | | |
|---|---|---|
| GB | 2074845 A1 * | 11/1981 |
| GB | 2 229 317 | 9/1990 |
| GB | 2269614 A1 * | 2/1994 |
| GB | 2 282 527 | 4/1995 |
| GB | 2 321 004 | 7/1998 |
| WO | WO 94/19850 * | 9/1994 |

* cited by examiner

ELECTRICAL CABINET AND A FRAME THEREFOR

This application is a national phase of International Application No. PCT/GB99/04394 filed on Dec. 23, 1999 and published in English under Publication No. WO 00/41283.

This invention relates to frames for electrical cabinets and to electrical cabinets.

BACKGROUND

Electrical cabinets for receiving electronic and electrical components, are used in connection, for example, with the operation of local data networks. The components, for example, subracks with electronic and electrical components, fans and other accessories are mounted within the cabinets on internal frames. The cabinets generally have side panels, a door and end panels that surround and are mounted on the frame.

These electrical cabinets require access for cables, which are often thick and unwieldy, and also for people to service the appliances. Conventional frames have-substantial die-cast end members. One frame of the prior art is designed with end members that have recesses in the sides, these recesses can be used for cable access so that, with the side panels of the cabinet removed, cables do not need to be threaded through access holes. Despite the advantages of side recesses these end members are nevertheless, bulky, expensive to manufacture and the space for the cables is limited.

SUMMARY

According to one aspect of the invention there is provided a frame of an electrical cabinet, said frame comprising:

two transverse members disposed at opposite ends of the frame and connected together by at least two side members, each of the transverse members having a skeletal form comprising at least one tube and/or bar with at least one side of each transverse member having a recess in a substantial part of said at least one side.

The device of the present invention overcomes or at least alleviates the problems of the prior art by providing transverse members which are skeletal in form, making them cheap to manufacture. The skeletal form also provides for large recesses which allow good cable access and also enable service personnel to place their feet inside the cabinet giving them better access to the electronic equipment they are servicing. Thus the present invention can provide a frame for an electrical cabinet with improved performance and at approximately two thirds of the price of the frames of the prior art.

Advantageously, the frame has four of the side members. The provision of four side members and transverse members at either end of the frame can provide a robust construction for the frame.

In preferred embodiments, the transverse member is formed from two bars or tubes connected together. Advantageously, these two bars or tubes have the same shape and are connected at and around points half way along their respective lengths. The use of bars or tubes having substantially the same shape reduces manufacturing costs.

The tubes or bars may, advantageously, be substantially "U" shaped and may be connected together at the bases of the two "U"s. This provides a robust shape from a small amount of material. It also provides large recesses in the sides which are convenient for cable and personnel access.

In some embodiments, the base of the "U" shaped bars or tubes are substantially straight. This arrangement allows for the two bars to be more easily and robustly joined together. This is particularly so if they are welded or brazed together. Welding and brazing provide a convenient, strong and cost effective way of joining the two components.

In an alternative embodiment, the bars or tubes are joined to form a substantially cross shape, preferably an elongate cross shape wherein the end portions of one side of said elongate cross is parallel to the other side. This arrangement also provides for large side recesses.

In some embodiments, the transverse member may comprise further strengthening bars or tubes connected to both of said two tubes or bars.

According to another aspect of the invention, there is provided an electrical cabinet comprising a frame as described above and further comprising removable side panels, end panels and/or doors. Electrical cabinets may require the various components to be interchanged or serviced and therefore the provision of side and end panels that are easily removable is very convenient. Although these panels and doors may be screwed on, in preferred embodiments they are attached to the frame by hooks thereby facilitating their removal.

Although the side panels may be mounted directly to the frame, in some embodiments they are mounted on cantilevers extending out from the frame. This arrangement allows for extra space at the sides of the cabinet.

BRIEF DESCRIPTION OF THE DRAWINGS

Embodiments of the present invention will now be described, by way of example only, and with reference to the accompanying drawings, in which.

DETAILED DESCRIPTION

Figure 1:
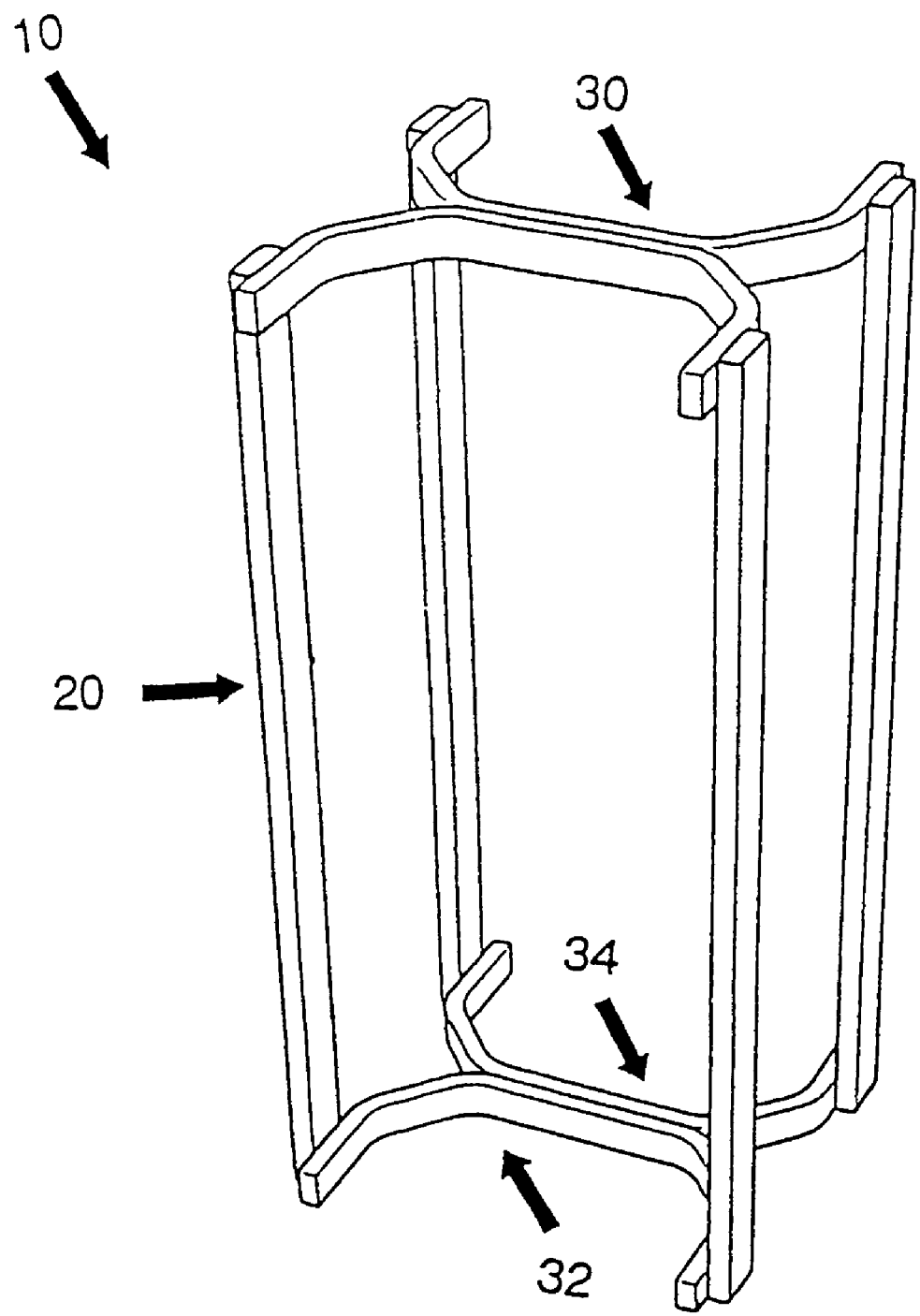
FIG. 1 illustrates a frame according to an embodiment of the present invention.

FIG. 1 illustrates a frame according to an embodiment of the present invention. The frame 10 comprises tubular side members 20, connected together by two tubular transverse members 30 at either end of the side members. The tubular transverse members comprise two straight based "U" shaped tubes 32, 34 welded together. Although in preferred embodiments the transverse member is comprised of tubular members welded together it may alternatively be formed of bars, and the two pieces may be crimped or screwed together.

Figure 2:
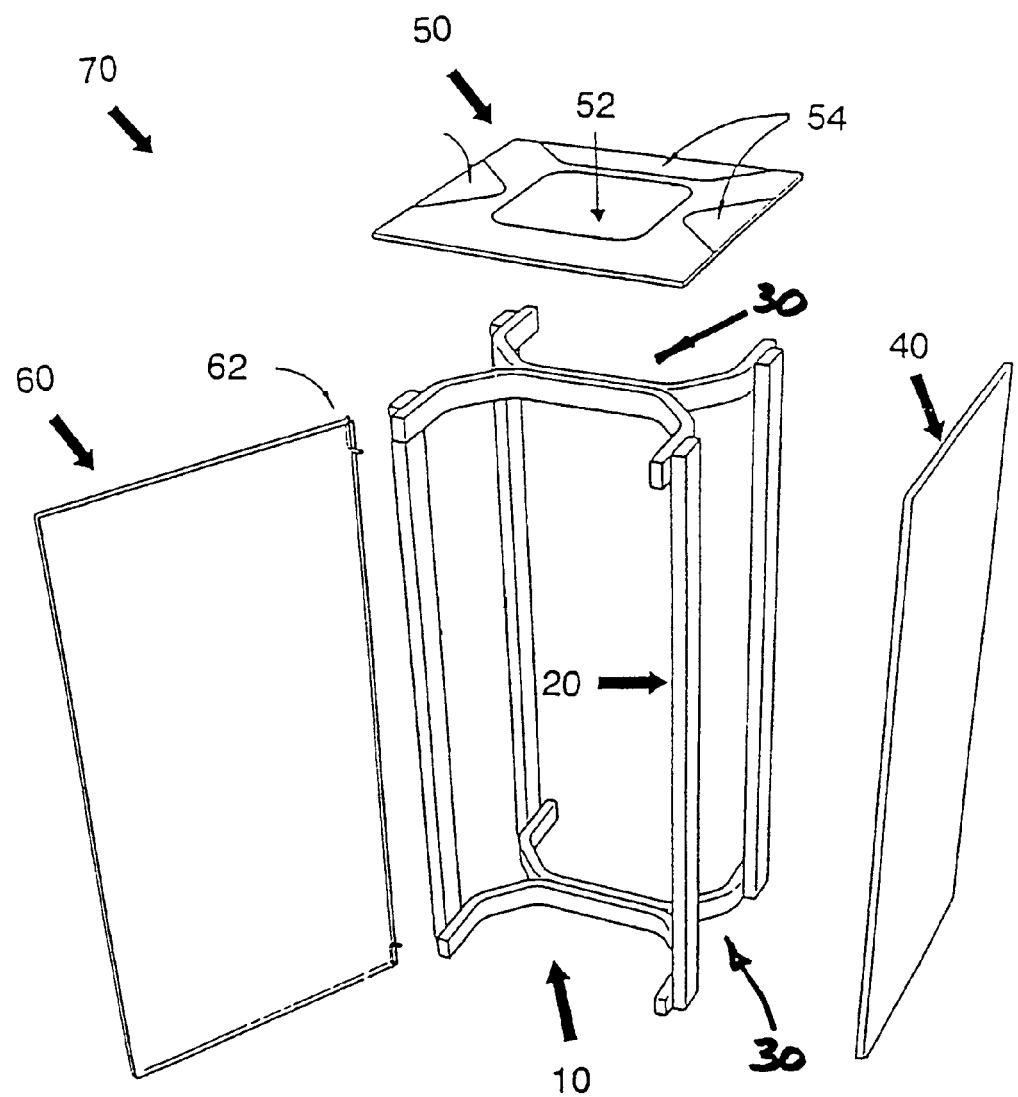
FIG. 2 illustrates the frame of FIG. 1 with associated side and end panels and a quick-release door.

FIG. 2, illustrates side panels 40, an end panel 50 and a removable door 60 that are mounted on the frame of FIG. 1 to form an electrical cabinet. The removable door is mounted via hooks 62 in holes (not shown) on the side members 20 of the frame 10, thereby forming a quick-release fitting. The end panel 50, has a ventilation hole 52, and cable access recesses 54. Electrical cabinets typically have a width of 19" (approximately 48 cm). They are often mounted on wheels (not shown) for ease of movement.

Figure 3:
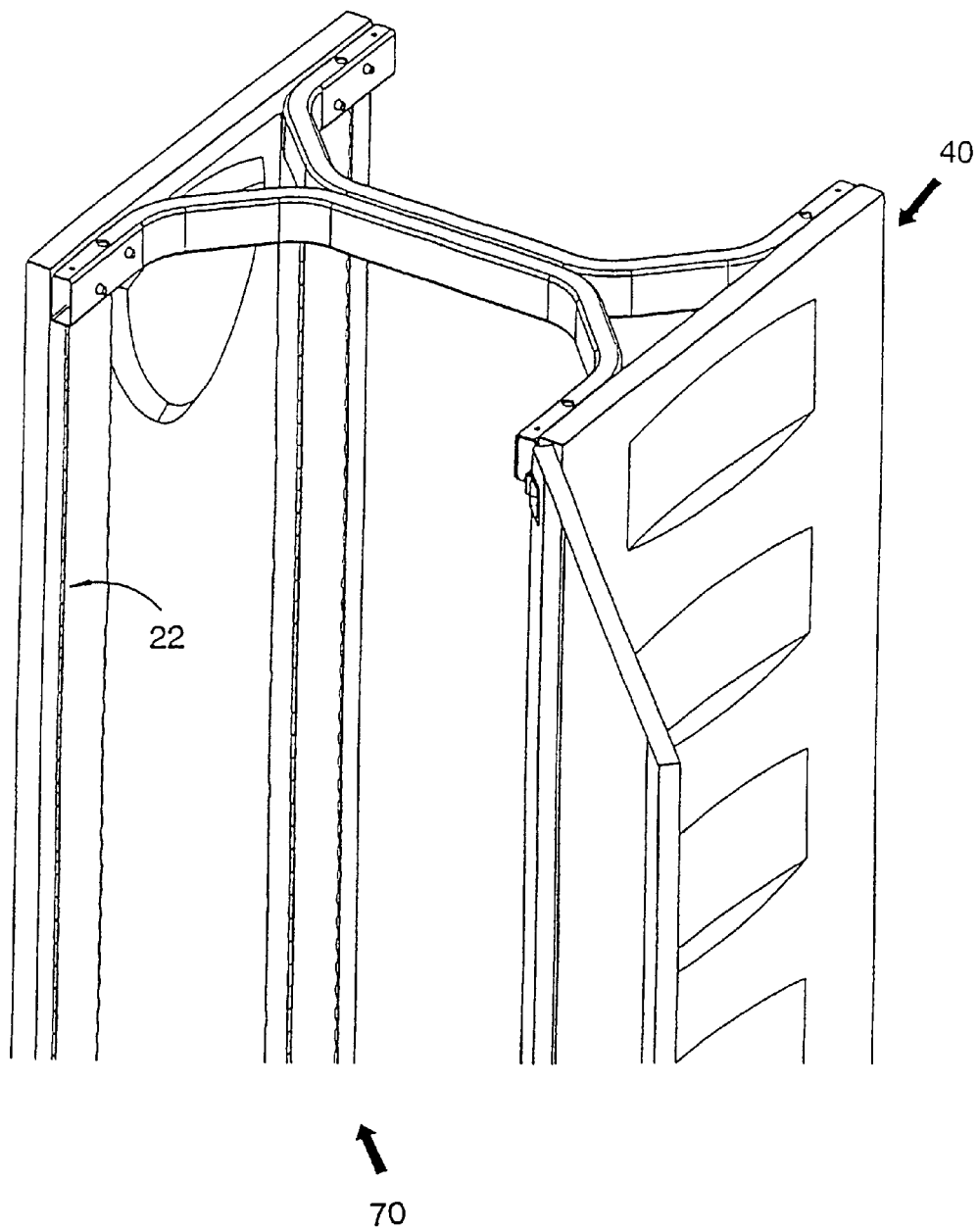
FIG. 3 illustrates a portion of an electrical cabinet according to another embodiment of the present invention.

FIG. 3 illustrates a view of a portion of an electrical cabinet 70 according to an embodiment of the present invention. This electrical cabinet 70 has no end member. Electrical cabinets that are the same height as the room in which they are located, with cabling coming down from the ceiling, are often used, such electrical cabinets generally have no end members. In this embodiment the side panels 40 have ventilation holes. The side members 20 of the end frame comprise holes 22 which receive hooks attached to elements to be mounted in the electrical cabinet.

Figure 4:
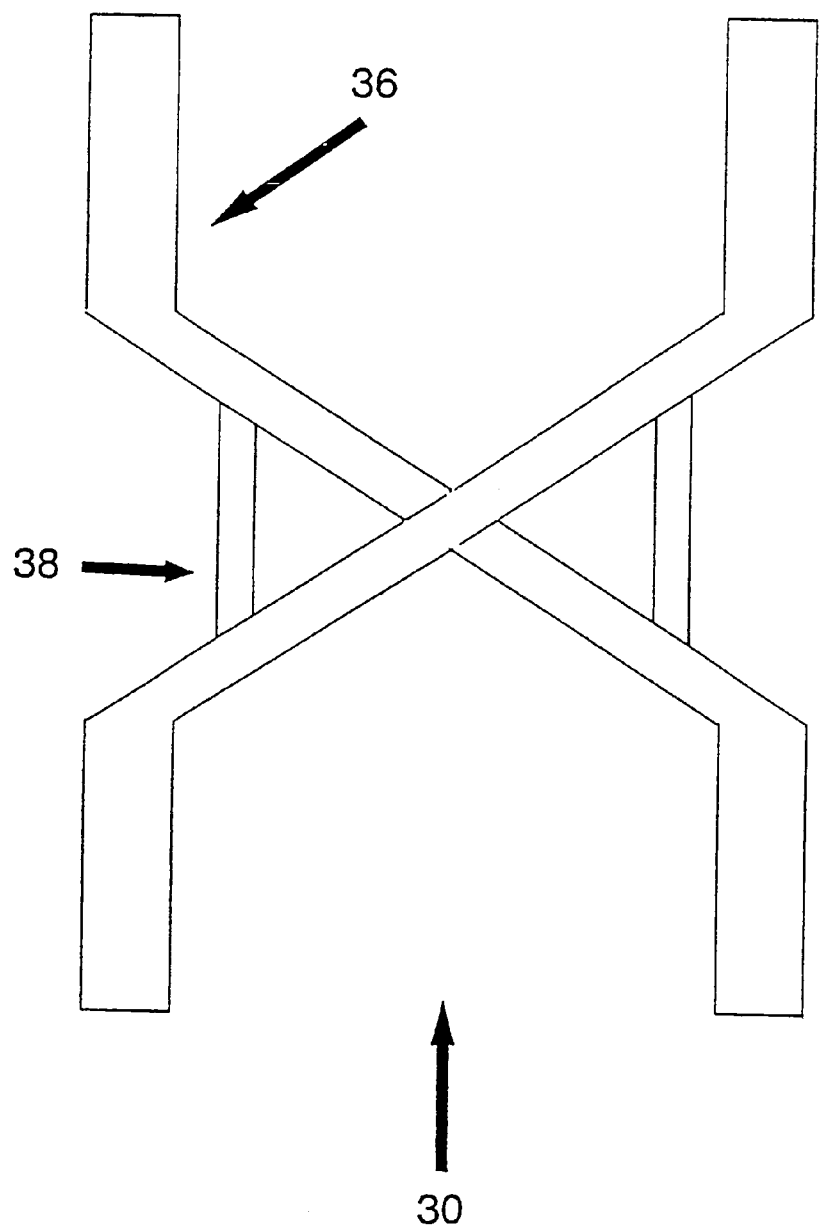
FIG. 4 illustrates a transverse member for a frame according to an embodiment of the present invention.

FIG. 4, illustrates an alternative embodiment of the transverse member 30 of the frame. This member is—formed of two main bars or tubular members 36 welded together to form an elongate cross shape. Additional strengthening bars or tubes 38 may be used to support the structure. Although it is preferred to weld or braze the two portions together they may also be attached by crimping, or by screw attachments.

The invention claimed is:

1. A frame for an electrical cabinet comprising:
    a first and a second transverse member, each of the transverse members comprising:
        a base section generally parallel to the front of the frame and spaced a depth from the front;
        a first, a second, a third, and a fourth lateral arm section, each of the lateral arm sections being substantially perpendicular to the base section; and
        a connecting section coupling each of the lateral arm sections to the base section so as to truncate an inside corner formed between the arm sections and the base section at an intersection of axes of the arm sections and the base section so as to form an angle of greater than ninety degrees between the connecting section and each of the axes of the base and the arm section; and
    at least a first and a second side member, each of the side members extending from at least one of the lateral arm sections of the first transverse member to an opposing lateral arm section of the second transverse member, wherein the first and second transverse members define opposite ends of the frame relative to the side members.

2. The frame for an electrical cabinet according to claim 1, wherein each of the transverse members comprises bars or tubes.

3. The frame as defined in claim 1, wherein each of the transverse members comprises a first and a second U-shaped member, each of the U-shaped members comprising a base member forming a portion of the base section, two of the first, second, third, and fourth lateral arm sections, and the connecting sections coupling the base member of the U-shaped member to the lateral arm sections, and wherein the base member of the first U-shaped member is aligned with and coupled to the base member of the second U-shaped member to form the base section of the transverse member.

4. The frame for an electrical cabinet according to claim 3, wherein the side members comprise bars or tubes.

5. The frame for an electrical cabinet according to claim 3, further comprising removable side panels which form a cabinet.

6. The frame for an electrical cabinet according to claim 5, wherein the removable side panels and/or a removable door are removably attached to the side members of the frame by hooks.

7. The frame for an electrical cabinet according to claim 3, further comprising at least one removable door.

8. The frame for an electrical cabinet according to claim 3, further comprising at least one removable end panel.

9. The frame as defined in claim 3, wherein the first U-shaped member comprises the first and third lateral arm sections and the second U-shaped member comprises the second and fourth lateral arm sections and wherein the first lateral arm section of the first U-shaped member is substantially parallel to the second lateral arm section of the second U-shaped member in each transverse member, and wherein the third lateral arm section of the first U-shaped member is substantially parallel to the fourth lateral arm section of the second U-shaped member in each transverse member.

10. The frame as defined in claim 9, further comprising a third and a fourth side member, and wherein the first, second, third and fourth side members each extend from an outer edge of one of the lateral arms in the first transverse member to an outer edge of an opposing lateral arm in the second transverse member.

11. The frame as defined in claim 3, wherein the base member of the first U-shaped member is welded to the base member of the second U-shaped member.

12. The frame as defined in claim 3, wherein the connecting sections are angled with respect to the base section and the lateral arm section.

13. A frame for an electrical cabinet, comprising:
    a first and a second transverse member, each of the transverse members comprising:
        a first and a second U-shaped member, each of the first and second U-shaped members comprising a base, a first and a second lateral arm section provided at opposing ends of the base and a connecting section coupling each of the lateral arm sections to the base section so as to truncate a corner formed at an intersection of axes of the arm sections and the base section, wherein the base of the first U-shaped member is aligned with and coupled back-to-back to the base of the second U-shaped member such that the first and second lateral arm sections of the first U-shaped member extend parallel to and away from the second and first lateral arm sections of the second U-shaped member, respectively; and
    at least a first and a second side member, each of the first and second side members extending between the first transverse member and the second transverse member on opposing sides of the transverse members, wherein the first and second side members extend from an outer edge of the lateral arm section of the first transverse member to an outer edge of the lateral arm section of the second transverse member such that the first and second transverse members define opposing ends of the frame.

14. The frame as defined in claim 13, wherein at least one of the connecting sections is angled.

15. The frame as defined in claim 13, further comprising at least one removable side panel coupled to the side members.

16. The frame as defined in claim 13, wherein the first and second U-shaped members are constructed from tubes.

17. The frame as defined in claim 13, wherein the first and second U-shaped members are constructed of bars.

* * * * *